United States Patent [19]

McClure et al.

[11] Patent Number: 5,018,342
[45] Date of Patent: May 28, 1991

[54] METHOD FOR SHEAR BAR ADJUSTMENT IN A FORAGE HARVESTER

[75] Inventors: John R. McClure, New Holland; Marvin G. Weaver, Jr., Lititz; Richard P. Strosser, Akron, all of Pa.

[73] Assignee: Ford New Holland, Inc., New Holland, Pa.

[21] Appl. No.: 508,573

[22] Filed: Apr. 13, 1990

[51] Int. Cl.$^5$ .................. A01D 55/00; B02C 25/00
[52] U.S. Cl. ............................... 56/10.5; 241/30; 241/37; 241/101.7; 241/241; 340/684; 340/686; 371/62
[58] Field of Search ............... 56/10.5; 241/30, 37, 241/101.2, 101.3, 101.7, 222, 239, 240, 241, 242; 340/684, 686; 371/62; 364/424.07, 508

[56] References Cited

U.S. PATENT DOCUMENTS

| | | | |
|---|---|---|---|
| 3,769,666 | 11/1973 | Kaufman | 241/37 X |
| 4,198,006 | 4/1980 | Rolfe | 241/222 |
| 4,205,797 | 6/1980 | Bennett, Jr. et al. | 241/222 |
| 4,436,248 | 3/1984 | Lindblom et al. | 241/101.7 |
| 4,474,336 | 10/1984 | Fleming | 241/221 |
| 4,479,346 | 10/1984 | Chandler | 56/10.2 |
| 4,631,683 | 12/1986 | Thomas et al. | 371/62 X |
| 4,799,625 | 1/1989 | Weaver, Jr. et al. | 241/30 |

Primary Examiner—William P. Neuder
Attorney, Agent, or Firm—Griffin, Branigan & Butler

[57] ABSTRACT

In a forage harvester, a shear bar is adjusted relative to the knives of a rotating cutterhead by selectively energizing first and second motors to move one or the other end of the shear bar toward the cutterhead. A vibration sensor senses vibration of the shear bar and controls a circuit to deenergize an energized motor when vibration is induced in the shear bar. The vibration may be caused by impact of the cutterhead knives on the shear bar (a true hit) or by random noise (detected as a false hit). To discriminate between false hits and true hits, an energized motor is stopped when a first hit (true or false) is detected. A timer is set to time an interval at least as great as the time it takes the cutterhead to make one revolution, and during this interval the vibration sensor is repeatedly sampled to determine if a second hit has occurred. If a second hit is detected during the interval the first hit is assumed to be a true hit. If a second hit is not detected during the interval then the first hit is assumed to be a false hit and the deenergized motor is restarted.

7 Claims, 5 Drawing Sheets

METHOD FOR SHEAR BAR ADJUSTMENT IN A FORAGE HARVESTER

RELATED DISCLOSURES

The disclosure of U.S. Pat. No. 4,799,625 is incorporated herein by reference.

FIELD OF THE INVENTION

The present invention relates to an improvement in a method of adjusting the position of a shear bar so that it is parallel to the rotating cutterhead of a forage harvester or similar apparatus. More particularly, the present invention provides a novel method for discriminating between the vibrations induced in the shear bar by contact between the shear bar and knives carried by the rotating cutterhead and those vibrations induced in the shear bar by random noise in the harvester.

U.S. Pat. No. 4,799,625 discloses an automatically operated apparatus for adjusting the shear bar of a forage harvester so that it is parallel to, but spaced slightly from, a rotating cutterhead. Two motors are provided for selectively moving respective ends of the shear bar toward and away from knives carried by the cutterhead. A piezo-electric crystal or similar sensor is mounted on the shear bar support for sensing vibration induced in the support caused by contact between the rotating knives and the shear bar. The output signal from the sensor is applied to a microprocessor based-control circuit which in turn selectively controls the motors to move one end and the other of the shear bar until it is parallel to, but spaced from, the cutterhead.

While the apparatus and method described in U.S. Pat. No. 4,799,625 are admirably suited for adjusting the shear bar in a forage harvester, it has been found that intermittent extraneous "noise" vibrations may be induced in the shear bar. These vibrations are detected by the vibration sensor and lead to sometimes erratic control of the motors during adjustment of the shear bar position. Such "noise" vibrations or false hits may result from foreign objects such as shields rattling, rough bearings or objects hitting the harvester.

SUMMARY OF THE INVENTION

An object of the present invention is to provide a novel method of controlling the adjustment of a shear bar relative to a rotating cutterhead.

An object of the invention is to provide a method of controlling the adjustment of a shear bar relative to a rotating cutterhead wherein vibration in the shear bar resulting from impacts on the shear bar by the cutterhead are distinguished from vibrations resulting from other sources, and only the vibrations resulting from impacts by the cutterhead are recognized for controlling the adjustment of the shear bar.

An object of the invention is to provide a method as described above wherein first and second bidirectional motors are selectively energized one at a time to move respective first and second ends of a shear bar relative to the knives of a rotating cutterhead to adjust the clearance between the shear bar and the knives, and a vibration sensor is provided for sensing vibrations of the shear bar, a method for improving the accuracy of adjustment of the shear bar, the method comprising the steps of: while one of the motors is energized to move its respective end of the shear bar toward the rotating cutterhead, sensing the output of the vibration sensor and comparing the output of the vibration sensor with a threshold value to determine if the vibrations indicate a hit has occurred; stopping the one motor and initiating a timer to time an interval when it is determined that a hit has occurred; repeatedly sensing the output of the vibration sensor and comparing its output with the threshold value to determine if a second hit occurs during the time interval; and, energizing the one motor to move its respective end of the shear bar away from the cutterhead only if it is determined that a second hit occurred in the time interval.

A further object of the invention is to provide a method as described above wherein the one motor is reenergized to move its respective end of the shear bar toward the cutterhead when a second hit does not occur during the time interval.

Other objects of the invention will become apparent upon consideration of the following description and the accompanying drawing.

DETAILED DESCRIPTION OF THE INVENTION

Figure 1:
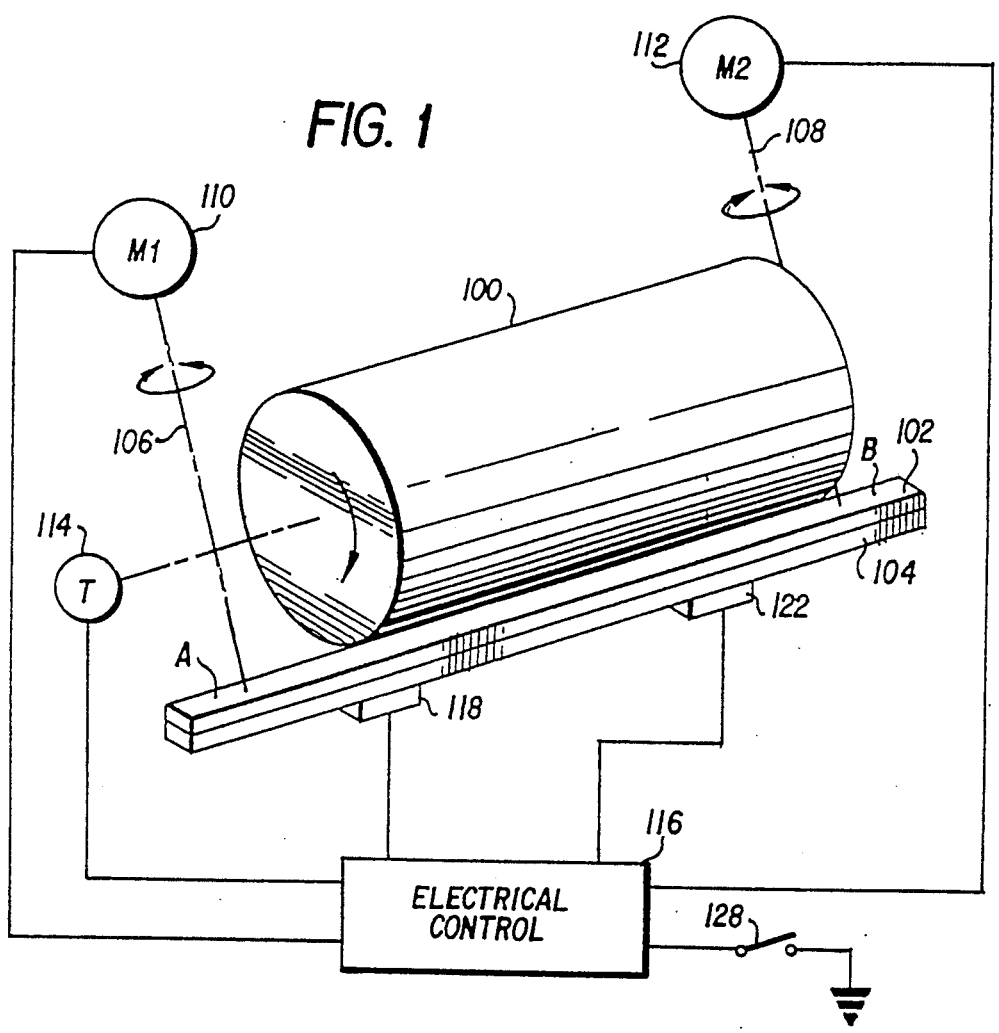
FIG. 1 illustrates an apparatus for adjusting a shear bar relative to a rotating cutterhead; and, FIGS. 2A-2E illustrate an ADJUST routine executed by the electrical control circuit of FIG. 1 to control the adjustment of the shear bar.

FIG. 1 corresponds to FIG. 1 of U.S. Pat. No. 4,799,625 and reference may be made to that patent for a complete description of the system to which the present invention relates. Briefly, two bidirectional motors 110 and 112 are connected by lead screws 106 and 108 to respective ends of a shear bar 102. The shear bar is supported by a support bar 104 but is movable relative thereto. A vibration sensor such as a piezo-electric crystal 118 is mounted on support bar 104 and produces an electrical output signal which is applied to an electrical control circuit 116 which may be a programmed microprocessor system as described in the aforementioned patent. A conventional rotatable cutterhead 100 carries knives (not shown) which cooperate with the shear bar 102 to cut crop material passing between the cutterhead and the shear bar.

A shear bar adjustment cycle is initiated when an operator actuates a switch 128 to apply a start signal to the control circuit 116. In response to the start signal the microprocessor in control circuit 116 executes an ADJUST routine as illustrated in FIGS. 12A-12D of U.S. Pat. No. 4,799,625. These figures correspond to FIGS. 2A-2D of the present application with one exception as discussed below. In the following description, only those steps of the ADJUST routine necessary for an appreciation of the present invention are described and reference may be made to the aforementioned patent for a complete description.

The ADJUST routine controls the motors 110 and 112 to selectively move first one end of the shear bar 102 and then the other. During execution of the ADJUST routine jumps are repeatedly made to a RDSENS routine to sense the output of vibration sensor 118. The cutterhead 100 is rotating during execution of the ADJUST routine and if movement of an end of the shear bar 102 causes the bar to be impacted by the rotating cutterhead the resulting vibration of the shear bar and its support 104 is detected by sensor 118. The output from the sensor 118 is used by the microprocessor in control circuit 116 to further control the energization of motors 110 and 112.

The ADJUST routine begins at step 1200 by clearing flags and setting location TIMS to a value of 2. The value in TIMS is decremented as subsequently described and when it reaches 0 the ADJUST routine is complete. At step 1205, a jump is made to a GETNOI routine which accomplishes two things. It energizes motor 110 to move one end of the shear bar 102 outwardly away from the rotating cutterhead and then energizes motor 112 to move the other end of the shear bar away from the cutterhead. The GETNOI routine also senses the output of the vibration sensor 118 to determine its "noise" output, that is, the output of the sensor resulting from normal machine vibrations. From this noise output the routine generates and saves a threshold value NOI2.

Upon return from the GETNOI routine, the ADJUST routine executes step 1206 where it prepares to energize motor 110 (M1) to move the shear bar inwardly, and sets location WHICHMO to indicate that M1 is being controlled. At steps 1207 M1 is energized to begin moving one end of the shear bar 102 toward the cutterhead 100. The routine also retrieves ONTIME from memory at step 1207. ONTIME is the number (typically 10) of 0.25 second intervals that M1 is to be energized, provided that the shear bar is not first impacted by the rotating cutterhead. At step 1208 location QSEC is set to time a ¼ second interval. Steps 1209 and 1210 introduce a 100 MS delay to allow time for electrical transients resulting from energization of motor M1 to die out.

At step 1211 a jump is made to a RDSENS routine which samples the output of vibration sensor 118 and converts it to a digital value. Upon return to the ADJUST routine this value is compared at step 1212 with the threshold value NOI2 which was determined at step 1205. If the value is greater than NOI2 then it is assumed that a hit has occurred, that is, the shear bar has been impacted by the knives of the rotating cutterhead.

Assuming step 1212 determines that no hit has occurred, QSEC is decremented at step 1226 and tested at step 1227. If 0.25 s has not elapsed since step 1208 was executed, the routine branches back to step 1211 to again execute the RDSENS routine. Assuming that step 1212 determines that no hits have occurred, the loop including steps 1211, 1212, 1226 and 1227 is repeatedly executed with QSEC being decremented at step 1226 on each execution of the loop. After ¼ second the test at step 1227 proves true and the routine moves to step 1228 where ONTIME is decremented and QSEC is reset to 0.25 S. ONTIME is then tested at step 1229 to see if it has been reduced to zero and if it has not, the routine branches back to step 1211 to again repeatedly execute the loop including steps 1211, 1212, 1226 and 1227, with steps 1228 and 1229 being included once each ¼ second. Thus, assuming no hit is detected, the motor M1 remains energized for an interval corresponding to the value of ONTIME times ¼ second. At the end of this interval the test at step 1229 proves true and the routine moves to step 1262 (FIG. 2C) where it clears two impact flags IMP1 and IMP2 and a hit flag HITFLG. The routine then advances to step 1230 (FIG. 2D) where motor M1 is turned off. Step 1232 and then either step 1233 or 1234 is executed to switch the indication in WHICHMO to indicate the other motor, in this case motor M2, and the direction in which the motor is to be energized to move the shear bar inwardly toward the cutterhead. The routine then branches back to step 1207 and the routine is repeated as described above, except that motor M2 is energized to move end B of the shear bar 102 toward the cutterhead.

Depending on the position of the shear bar at the time the adjusting procedure is initiated, M1 and M2 may be alternately energized one or more times as described above without driving either end of the shear bar into contact with the rotating cutterhead. Eventually however, energization of one of the motors will result in contact. When RDSENS is executed at step 1211 to sense and digitize the output of vibration sensor 118, this output will be larger than NOI2. Therefore the comparison at step 1212 proves true and the routine branches. As disclosed in U.S. Pat. No. 4,779,625, the branch is made directly to step 1240 (FIG. 2C) where the active motor is turned off. WICHMO is tested at step 1241 to determine whether motor M1 or M2 was energized at the time the hit was detected.

Assuming the test at step 1241 shows that motor M1 was energized, the impact flag IMP1 is set at step 1242. At step 1243 the impact flags IMP1 and IMP2 are tested and if they are both set the hit flag HITFLG is set at step 1244 before the routine moves to step 1245. If both impact flags are not set, the routine advances from step 1243 to step 1245 without setting HITFLG.

At step 1245 the routine sets up parameters for energizing motor M1 for BOUT (typically 5) ¼ second intervals to move end A of the shear bar away from the cutterhead. The routine PULOUT is executed at step 1246 to energize motor M1 for the required interval.

At step 1247 HITFLG is tested and if it is not set then at step 1249 WICHMO is set to 2, QSEC is reset to 0.25 S and the code for energizing M2 to move end B of the shear bar toward the cutterhead is retrieved. The routine then branches back to 1207 to energize motor to energize motor M2.

If the test at step 1241 proves false, it means that motor M2 was energized at the time the hit was detected at step 1212. In this case steps 1252-1257 are executed. These steps are similar to steps 1242-1247 except that the impact 2 flag IMP2 is set at step 1252 and parameters are set up at step 1255 so that the PULOUT routine executed at step 1256 causes motor M2 to be energized to move end B of the shear bar away from the cutterhead. Also, if the test at step 1257 shows that HITFLG is not set then at step 1259 WICHMO is set to 1, QSEC is set to 0.25 S and the code for energizing motor M1 to move the shear bar toward the cutterhead is retrieved before the routine branches to step 1207.

HITFLG is set at step 1244 or 1254 only if the impact flags IMP1 and IMP2 are both set. It makes no different which of the impact flags is set first. Thus, a hit (detected at step 1212) while motor M1 is energized and another hit while motor M2 is energized is required to set HITFLG. When HITFLG is set, this condition is detected at step 1247 or 1257 and the routine moves to step 1260 where TIMS is decremented. TIMS is tested at step 1261 and if it is not zero then IMP1, IMP2 and HITFLG are reset at step 1262, the motor is turned off at step 1230, WICHMO is tested at step 1232 and a code is retrieved at step 1233 or 1234 to control movement of the other motor. The routine then branches to step 1207 to energize the other motor.

Since TIMS is initially set to the value 2 (at step 1261) and is decremented at step 1260 each time HITFLG is found to be set at step 1247 or 1257, two settings of HITFLG will result in TIMS being decremented to zero. This condition is detected at step 1261, the ADJUST routine ends, and the program jumps to a RDY routine.

Consider now the situation where a random noise in the harvester causes a vibration in the shear bar support 104 which is greater than the noise level NOI2. A random noise could be caused by a shield rattling or a rough bearing. If step 1211 of the ADJUST routine is executed while this vibration is occurring then the test at step 1212 will falsely indicate that the shear bar has been impacted by the rotating cutterhead. If the routine branches directly from step 1212 to step 1240 upon detection of this false hit, as provided in U.S. Pat. No. 4,799,625, the ADJUST routine may be terminated before the shear bar has been accurately positioned relative to the cutterhead.

As an example, assume that TIMS has been decremented to 1, IMP1 has been set and motor M2 has been energized to move end B of the shear bar toward the cutterhead. If step 1212 detects a hit and this hit is false, motor M1 is immediately turned off at step 1240 to stop inward movement of the shear bar. The test at step 1241 proves false so IMP2 is set at step 1252. Since IMP1 and IMP2 are both set, HITFLG is set at step 1254. Motor M2 is then energized at step 1256 to move end B of the shear bar away from the cutterhead. The test at step 1257 finds HITFLG set so TIMS is decremented to zero. The test at step 1261 finds that TIMS is zero so an exit is made from the ADJUST routine.

The inaccuracy of the final adjustment depends not only on the number of false hits determined at step 1212 but the timing of the false hits. Consider the following scenario. A first false hit is detected at step 1212 shortly after steps 1205 and 1206 are executed. Motor M1 is turned off (step 1240) and IMP1 is set (step 1241). Subsequently, motor M2 is energized and when a true hit is detected at step 1212 the motor is turned off, IMP2 is set and HITFLG is set. This causes TIMS to be decremented to 1, IMP1, IMP2 and HITFLG to be cleared, and motor M1 to be energized again. If another false hit occurs motor M1 is turned off, IMP1 is set and motor M2 is turned on. Finally, if a true hit is then detected at step 1212, motor M2 is turned off, IMP2 is set, HITFLG is set, TIMS is decremented to zero and the ADJUST routine ends. Under this assumed set of circumstances the end A of the shear bar, driven by motor M1, never impacts the cutterhead and the ADJUST routine is concluded before the end of the shear bar driven by motor M1 is even close to its desired position.

Since true hits result from impact of a knife or knives of the rotating cutterhead with the shear bar these hits tend to be cyclic. That is, if a knife impacts the shear bar on one revolution of the cutterhead, that same knife will impact the shear bar on the next revolution. Typically, the time between these impacts is on the order of 0.07 second or less. On the other hand, false hits tend to occur randomly with a longer interval of time elapsing between hits. The present invention alleviates the problem of false hits by providing a method of distinguishing between cyclic or true hits and non-cyclic or false hits. This is accomplished by modifying the ADJUST routine described above by adding steps as illustrated in FIG. 2E.

Figure 2A:
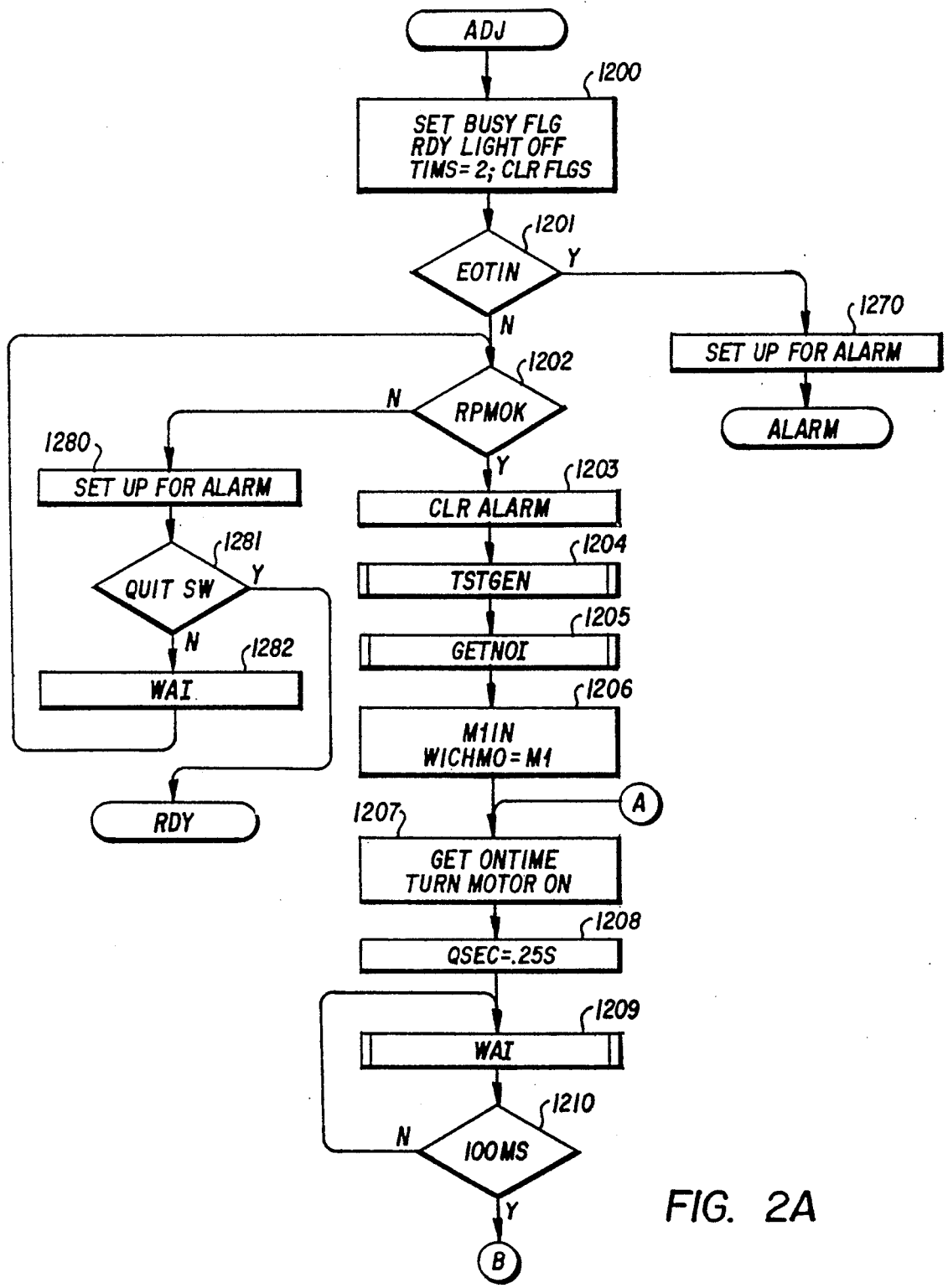
Figure 2B:
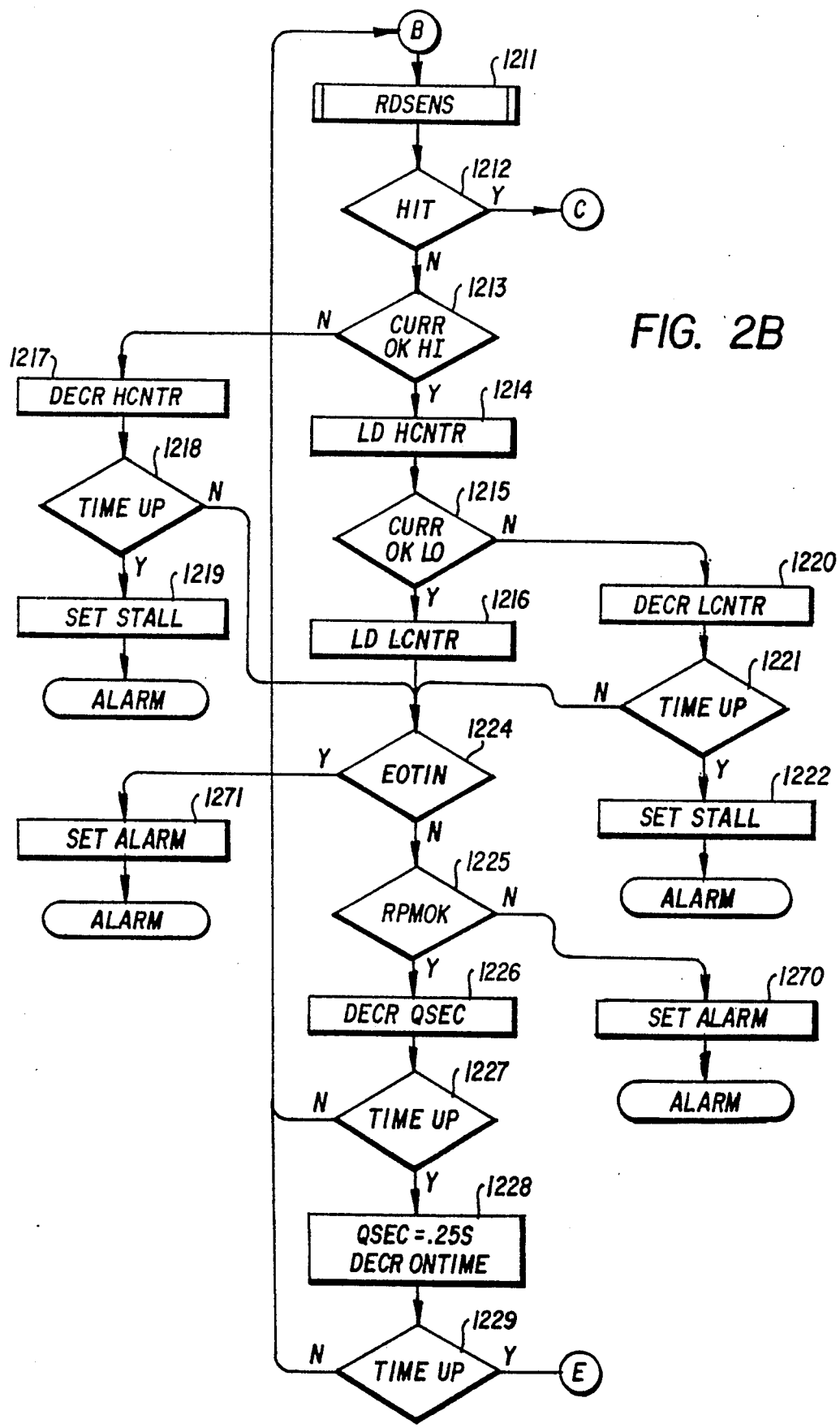
Figures 2C, 2D:
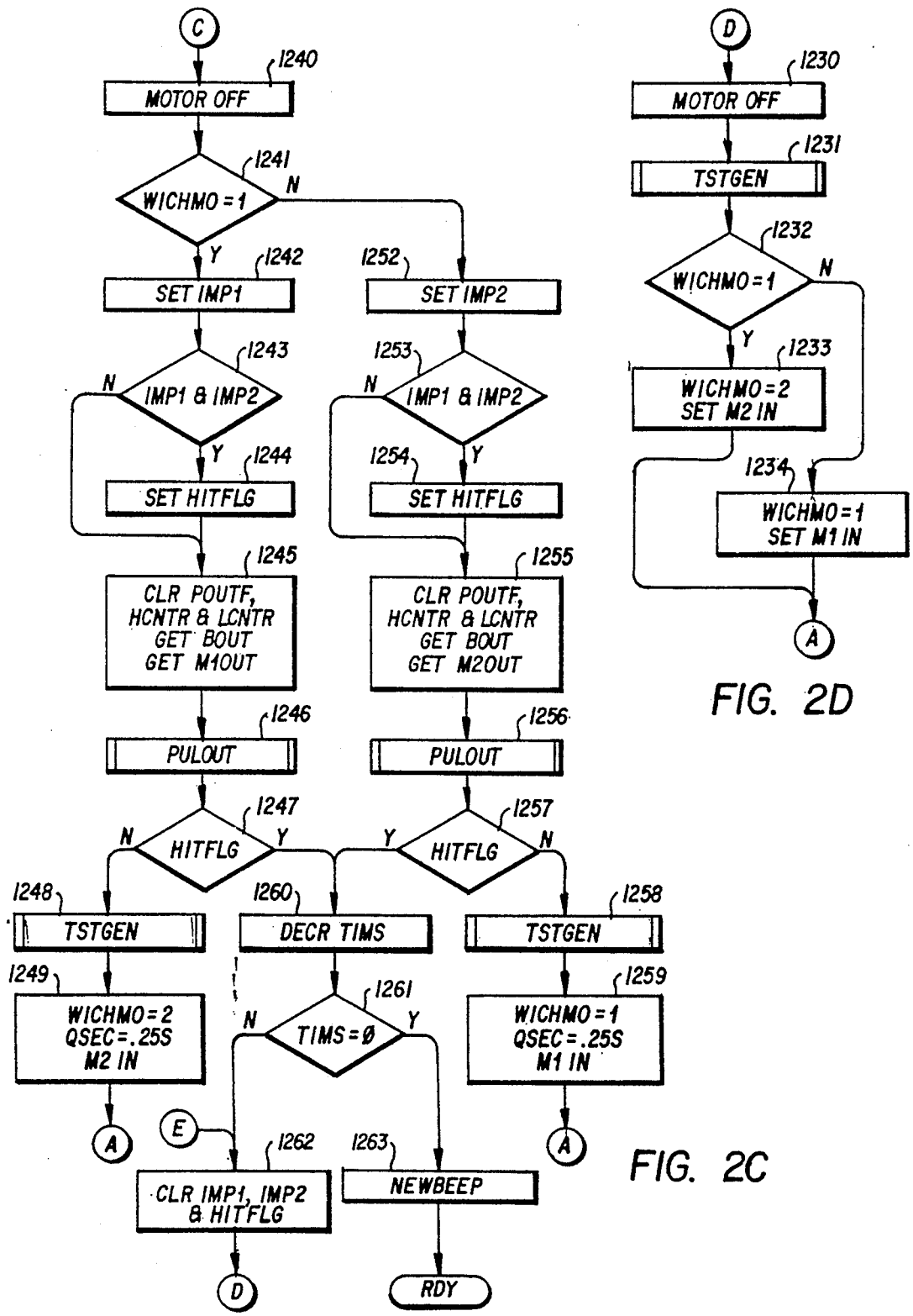
Figure 2E:
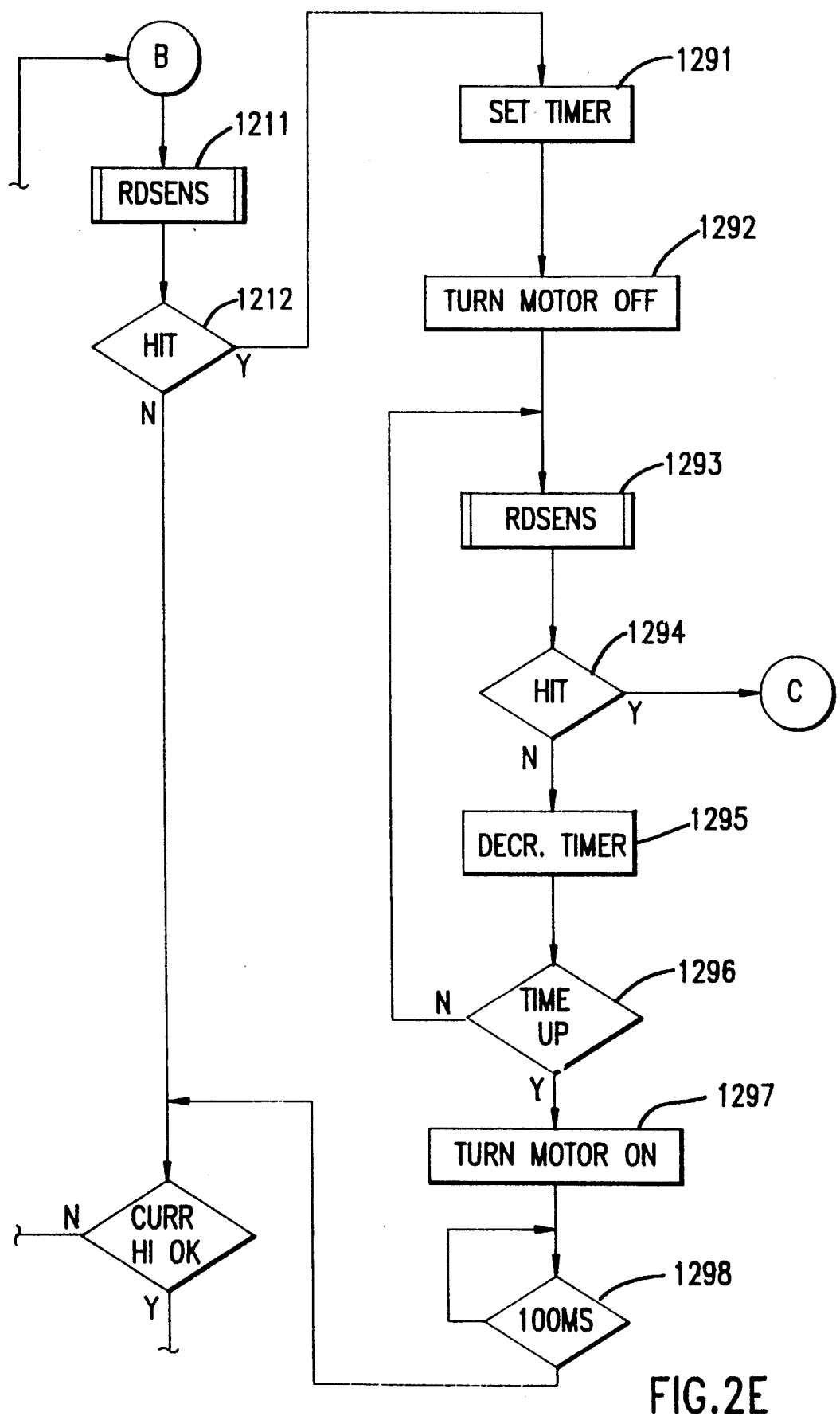

In FIG. 2E, the RDSENS step 1211, the hit comparison step 1212 and the step 1213 are the same steps as illustrated in FIG. 2B. Steps 1291-1296 are added to provide discrimination between true hits and false hits.

With the modified ADJUST routine, the shear bar adjusting system operates as follows. As previously explained, when the ADJUST routine reaches point B one of the motors M1 or M2 is energized and is in the process of moving one end of the shear bar 102 toward the rotating cutterhead 100. At step 1211 the routine RDSENS is executed to sense the output of vibration sensor 118 and at step 1212 the vibration sensor output is compared with the threshold value NOI2 and if it is greater than NOI2 it means that the shear bar is vibrating. This could be either a true hit or a false hit. The ADJUST routine branches to step 1291 where it sets a timer to time an interval at least as long as it takes the cutterhead 100 to make one revolution. At step 1292 the motor is turned off. This prevents damage to the shear bar and cutterhead knives in case the hit is a true hit. The ADJUST routine then enters a loop comprising steps 1293-1296.

At step 1293 the RDSENS routine is again executed to sense and digitize the output of vibration sensor 118. At step 1294 the digitized value is compared with NOI2 to determine if a hit has occurred. At step 1295 the timer set at step 1291 is decremented and at step 1296 the timer is tested to see if it has been decremented to zero. If it has not, the routine branches back to step 1293 to repeat the loop.

The loop is repeated until the timer is decremented to zero or until the comparison at step 1294 indicates that a hit has occurred, which ever comes first. If step 1294 indicates a hit then it is assumed that the hit detected at step 1212 was a true hit resulting from impact of a cutterhead knife on the shear bar 102. In this case the routine branches to point C of FIG. 2C and the ADJUST routine proceeds as previously described. On the other hand, if the timer times out it indicates that the hit at step 1212 was a false hit. The timer test at step 1296 proves true and the ADJUST routine advances to step 1297 where it again turns the motor on to move an end of the shear bar toward the cutterhead. At step 1298 the routine waits for about 100 MS to allow electrical transients resulting from energization of the motor to die out. The ADJUST routine then advances to step 1213. Referring to FIG. 2B, this puts the ADJUST routine back in the main loop (steps 1211-1216 and 1224-1229) for sensing hits. QSEC and ONTIME still hold the values they held at the time the false hit was detected at step 1211. Therefore, the main loop will be executed until QSEC and ONTIME are decremented to zero, or until the comparison at step 1212 indicates a hit (true or false) whichever comes first. Thus, once the main loop has been entered from step 1297 the ADJUST routine proceeds as previously described.

From the foregoing description it is seen that the present invention provides a simple method for improving the accuracy of shear bar adjustment by discriminating between true hits caused by impact of the cutterhead knives on the shear bar and false hits caused by various factors such as stones in the crop feed. While a preferred embodiment of the invention has been described in specific detail, it will be understood that various modifications may be made in the preferred embodiment without departing from the spirit and scope of the invention. It is intended therefore to be limited only by the scope of the appended claims.

The embodiments of the invention in which an exclusive property or privilege is claimed are defined as follows.

1. In a forage harvester wherein first and second bidirectional motors are selectively energized one at a time to move respective first and second ends of a shear bar relative to the knives of a rotating cutterhead to adjust the clearance between the shear bar and the knives, and a vibration sensor is provided for sensing vibrations of the shear bar, a method for improving the accuracy of adjustment of the shear bar, said method comprising the following steps:
   (a) while one of said motors is energized to move its respective end of the shear bar toward the rotating cutterhead, sensing the output of said vibration sensor and comparing the output of the vibration sensor with a threshold value to determine if said vibrations indicate a hit has occurred;
   (b) stopping said one motor and initiating a timer to time an interval when it is determined that a hit has occurred;
   (c) repeatedly sensing the output of said vibration sensor and comparing its output with said threshold value to determine if a second hit occurs during said timing interval; and,
   (d) energizing said one motor to move its respective end of the shear bar away from the cutterhead only if it is determined that a second hit occurred in said timing interval.

2. The method as claimed in claim 1 wherein said one motor is reenergized to move its respective end of the shear bar toward the cutterhead when a second hit does not occur during said timing interval.

3. The method as claimed in claim 1 wherein said one motor is reenergized to move its respective end of the shear bar toward the cutterhead and steps a–d are repeated when a second hit does not occur during said timing interval.

4. The method as claimed in claim 1 wherein said timer is set to time an interval which is at least as long as it takes the rotating cutterhead to make one revolution.

5. In a forage harvester wherein first and second bidirectional motors are selectively energized one at a time to move respective first and second ends of a shear bar relative to the knives of a rotating cutterhead to adjust the clearance between the shear bar and the knives, and a vibration sensor is provided for sensing vibrations of the shear bar, a method for improving the accuracy of adjustment of the shear bar, said method comprising the following steps:
   (a) setting a timer to time a maximum interval during which a motor is to be energized to move its respective end of the shear bar toward the rotating cutterhead;
   (b) energizing said one motor to move its respective end of the shear bar toward the rotating cutterhead;
   (c) while one of said motors is energized to move its respective end of the shear bar toward the rotating cutterhead, sensing the output of said vibration sensor and comparing the output of the vibration sensor with a threshold value to determine if said vibrations indicate a hit has occurred;
   (d) stopping said one motor and initiating a second timer to time a second interval when it is determined that a hit has occurred;
   (e) repeatedly sensing the output of said vibration sensor and comparing its output with said threshold value to determine if a second hit occurs during said second timing interval;
   (f) energizing said one motor to move its respective end of the shear bar way from the cutterhead only if it is determined that a second hit occurred in said second timing interval;
   (g) reenergizing said one motor to move its respective end of the shear bar toward the rotating cutterhead if it is determined that a second hit did not occur in said second timing interval; and,
   (h) if it is determined that a second hit did not occur in said second timing interval, repeating steps c–e and f or g.

6. The method as claimed in claim 5 wherein said second timer is set to time an interval which is at least as long as it takes the rotating cutterhead to make one revolution.

7. The method as claimed in claim 5 wherein said one motor is turned off at the end of said maximum interval unless, during said maximum interval, it has been energized to move its respective end of the shear bar away from the rotating cutterhead.

* * * * *